United States Patent [19]
Yamamoto et al.

[11] 3,779,437
[45] Dec. 18, 1973

[54] APPARATUS FOR CUTTING THE EDGES OF SHEET GLASS

[75] Inventors: Yasumichi Yamamoto; Kazuo Rokujo, both of Nishinomiya, Japan

[73] Assignee: Nippon Sheet Glass Co., Ltd., Osaka, Japan

[22] Filed: June 26, 1972

[21] Appl. No.: 266,353

[30] Foreign Application Priority Data
July 6, 1971 Japan.............................. 46/50112

[52] U.S. Cl........................ 225/96.5, 65/176, 225/3
[51] Int. Cl............................................. C03b 33/02
[58] Field of Search........................ 225/96.5, 3, 2; 65/97, 112, 176

[56] References Cited
UNITED STATES PATENTS
1,591,179  7/1926  Myers............................. 65/176 X
1,930,582  10/1933  Burdett et al..................... 225/96.5

Primary Examiner—Frank T. Yost
Attorney—E. F. Wenderoth et al.

[57] ABSTRACT

An apparatus for cutting the edges of a sheet glass, including at least two cutter means for providing cutting lines in the longitudinal direction at the desired positions across the glass sheet, two frames each having a conveyor for supporting the glass sheet and a break means for cutting the glass sheet along the cutting lines, and means for moving at least one of said frames so that said break means is in a predetermined relative position with respect to the cutting lines.

9 Claims, 5 Drawing Figures

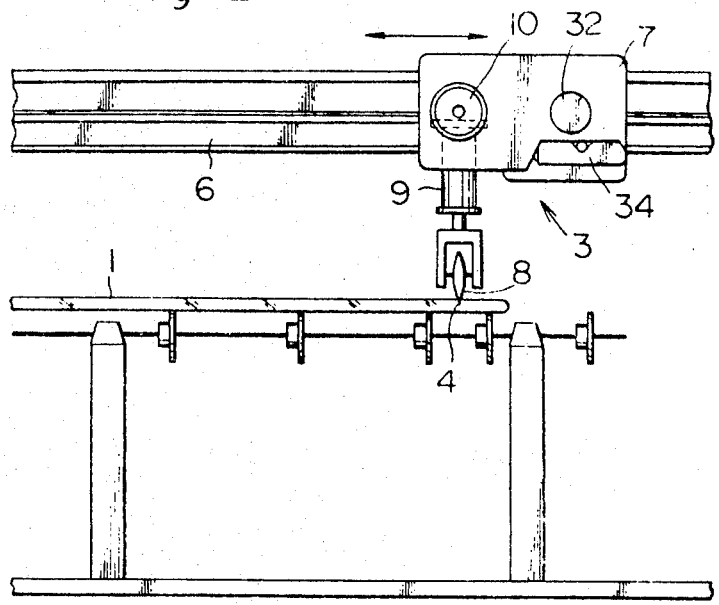
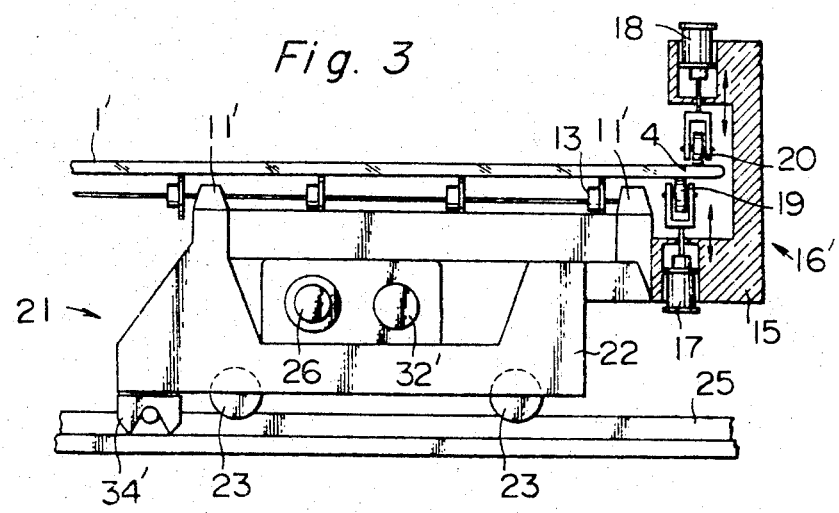

3,779,437

APPARATUS FOR CUTTING THE EDGES OF SHEET GLASS

This invention relates to an apparatus for cutting the edges of a sheet glass which can be applied to glass sheets of varying widths.

Generally, sheet glass is formed by drawing molten glass from a furnace in the form of ribbon, and cooling and solidifying it while advancing it along a prescribed passageway. Since both side edges of the ribbon-like glass thus solidified contain imperfections, it is necessary to cut them off.

Usually, the cutting of the edges of glass sheet is performed by providing cutting lines on the surface of the glass sheet by a cutter, then applying push rollers to the parts just outside the cutting lines, applying support rollers to the back of the glass sheet and at the parts just inside the cutting lines, and applying force to the glass by means of the push rollers thereby to bend and break the glass sheet along the cutting lines. The force of the push rollers does not concentrate on the cutting lines unless the cutting lines project outwardly of the side edges of a conveyor for advancing the sheet glass, and therefore it is impossible to break off the glass edges precisely.

In the conventional apparatus for cutting the edges of sheet glass, a roller conveyor is provided on a stationary frame, and the width of the conveyor is constant. Push rollers for breaking off the sheet glass and support rollers are mounted slidably onto a rod projecting sideways from the frame, and when the width of the glass sheet varies, the positions of the push rollers and the support rollers are manually adjusted corresponding to the positions of the cutting lines. When it is desired to break a sheet glass having a considerably larger width than that of the conveyor, the glass sheet is supported by auxiliary rollers provided slidably on an auxiliary rod projecting sideways from the frame.

Such a conventional apparatus possesses various defects. For example, with such an apparatus, it is impossible to break a sheet glass having width narrower than that of the conveyor. If the width of the conveyor is made too narrow so as to adapt it to a glass sheet of narrow width, a number of auxiliary rollers are required for treating a glass sheet of larger width. Especially, in the case of manufacturing float glass, the rate of drawing the ribbon glass needs to be changed in order to change the thickness of the ribbon glass. However, by the change of the glass drawing speed, the width of the glass sheet also changes. Thus, in the manufacture of float glass considerable fluctuations in width of the glass sheet cannot be avoided. Accordingly, much labor and time are needed in order to adjust the edge cutting apparatus according to varying widths of the glass sheet.

It is an object of this invention to provide an apparatus for cutting the edges of a glass sheet, wherein the positions of cutting can be adjusted rapidly and precisely over a wide range corresponding to the width of the sheet glass.

According to the present invention, there is provided an apparatus for cutting the edges of a sheet glass, including at least two cutter means for providing cutting lines in the longitudinal direction at the desired positions across the glass sheet, two frames each having a conveyor means for cutting the glass sheet along the cutting lines and breaking means for pushing and breaking off the edges of the glass sheet, and means for moving at least one of said frames with respect to the positions in the transverse direction corresponding to said cutter means.

The invention will be described in greater detail with reference to the accompanying drawings in which:

FIG. 2 is a view taken along the line II—II of FIG. 1;

FIG. 3 is a view taken along the line III—III of FIG. 1;

Figure 1:
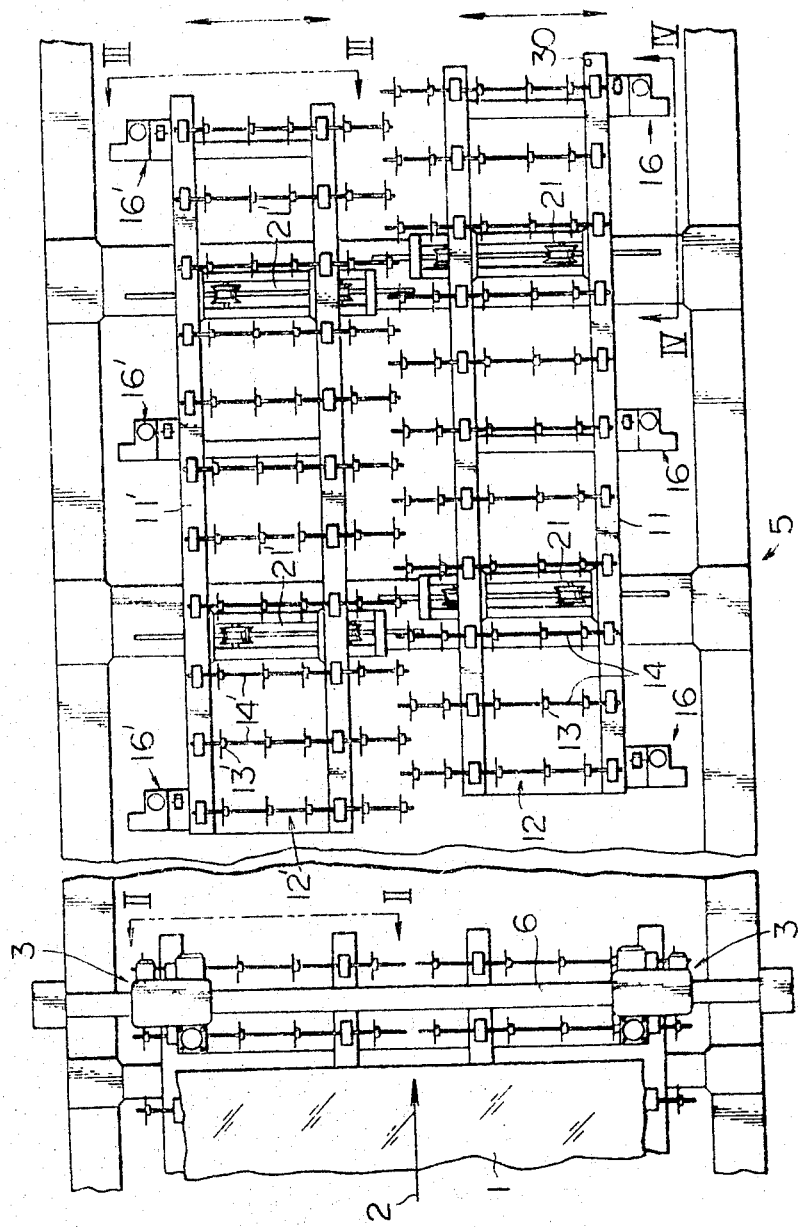
FIG. 1 is a plan showing one embodiment of the cutting means of this invention.

Referring to FIG. 1, a glass ribbon 1 is continuously advanced along a passageway 2. By a cutter means 3, cutting lines 4 are provided in the longitudinal direction at the desired positions (see FIG. 2). This cutting means 3 will be described in detail later on.

Usually, immediately downstream of the cutting means 3, there is provided a cutting mechanism for cutting the glass ribbon 1 in the transverse direction to form a sheet glass 1' of a predetermined length. Since this mechanism is irrelevant to the present invention, it is omitted in FIG. 1. The sheet glass 1' provided with the cutting lines 4 in the longitudinal direction is then supplied to a breaking mechanism 5, which will also be described in detail later on.

First the cutter means 3 will be described. As shown in FIGS. 1 and 2, the cutter means 3 is composed of a carriage 7 and a rail 6 provided above the passageway 2 for the glass sheet 1. The carriage 7 includes a blade 8, a pressure cylinder 9, a servomotor 10 and a resolver unit 32. The carriage 7 is moved to a predetermined position by a control mechanism to be described, and urges the blade 8 provided on the tip of the piston of the pressure cylinder 9 against the surface of the advancing glass sheet 1' thereby to provide cutting lines. The cutter means may be of any type which can provide cutting lines in the longitudinal direction at a desired position across the glass. Changing the positions of cutting lines may be effected by providing a plurality of blades and selecting one or more of the blades according to the desired positions.

Figure 4:
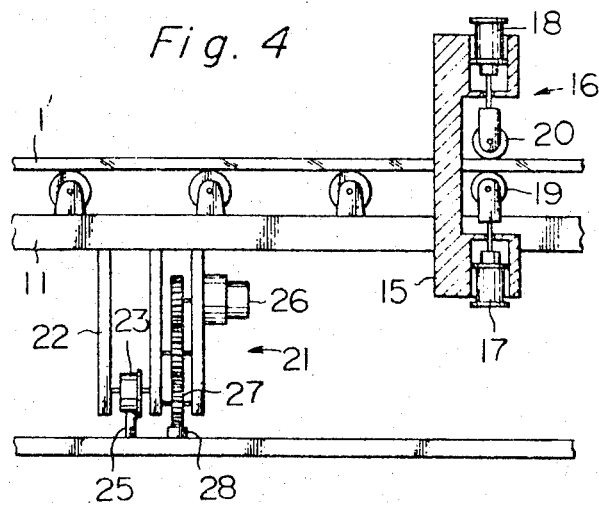
FIG. 4 is a view taken along the line IV—IV of FIG. 1.

The break mechanism 5 which is the principal part of the present invention will be described by reference to FIGS. 1, 3 and 4. The breaking mechanism 5 is composed of two frames 11 and 11' and means 21 for moving at least one of said frames. Roller conveyors 12 and 12' are provided above the frames 11 and 11' respectively. The roller conveyors 12 and 12' are composed of a number of conveyor rollers 13 and 13' and shafts 14 and 14' respectively, and driven by a motor (not shown). On the side portions of the frames 11 and 11', one or more break means 16 and 16' are provided corresponding to the length of the frame 11. These break means 16 and 16' will be described in detail later on.

In FIG. 1, the frames 11 and 11' are arranged transversely. The width of the roller conveyor as a whole can be varied by changing the distance between the frames 11 and 11' by a frame-moving means 21 to be described in detail. Preferably, as shown in FIG. 1, the shaft 14 of the frame 11 is arranged in deviating relationship with the shaft 14' of the other frame 11'. By the interposition of one shaft 14 between two adjacent shafts 14' or one shaft 14' between two adjacent shafts 14, the width of the conveyor can be varied over a wide range. When two frames 11 and 11' are arranged transversely as shown in FIG. 1, both edges of the glass sheet are cut simultaneously by the break means 16 and 16'. If desired, however, the two frames 11 and 11' may be arranged in a deviating fashion in the longitudinal direction. In this case, first one edge, and then the other, are cut successively.

In order to vary the distance between the frames 11 and 11' in the transverse direction, frame moving means 21 is provided below the frames 11 and 11'. It is preferred that one frame-moving means 21 should be provided for each of the two frames 11 and 11' as shown in FIG. 1, but it is possible to provide it only in one of the frames while fixing the other frame. As shown in FIGS. 3 and 4, the frame moving means 21 is composed of a wheel stand 22 for supporting the frame 11 and a sheel 23 for supporting the wheel stand 22 on a rail 25. The position of the wheel stand 22 is adjusted by a servometer 26, a pinion 27 and a rack 28 fixed to the floor corresponding to the position of the cutter means 3, i.e. corresponding to the positions of the cutting lines. The frame-moving means 21 may be of any type which can effect the movement of the frame 11 in the transverse direction.

The break means 16 consists of an air cylinder 17 secured upwardly to the lower portion of an auxiliary frame 15 which is integral with the frame 11, a support roller 19 secured to the end of the piston of said cylinder, an air cylinder 18 secured downwardly to the upper portion of the auxiliary frame 15, and a push roller 20 fixed to the end of the piston of said cylinder. In order to break the sheet glass along the cutting lines 4, the break means 16 must be adjusted so that it is at a prescribed relative position with respect to the cutting lines 4. In other words, the position of the frame 11 is adjusted so that the support roller 19 comes in abutment with the under surface of the sheet glass immediately inside the cutting lines and the push roller 20 comes in abutment with the upper surface of the sheet glass immediately outside the cutting lines. Corresponding to the length of the sheet glass, one pair or more of break means 16 and 16' are used. When two or more pairs of break means are used, a first pair of break means which are located ahead in the longitudinal direction (right side in FIG. 1) operate to cause cracks along the cutting lines, and after a lapse of a predetermined time, a second pair of break means operate.

The control of the movement of the frame 11 will be described in detail below. When the forward end of the sheet glass 1' supplied to the break means 5 touches a limit switch 30, the air cylinders 17 and 18 operate and as shown in FIG. 3, the support roller 19 and the push roller 20 touch the sheet glass 1', whereupon the sheet glass 1' is broken along the cutting lines 4. Instead of providing the air cylinder 17, a support roller fixed at a level slightly higher than the conveyor roller 13 may be used, and further, the conveyor roller 13 may serve also as a fixed support roller.

Figure 5:
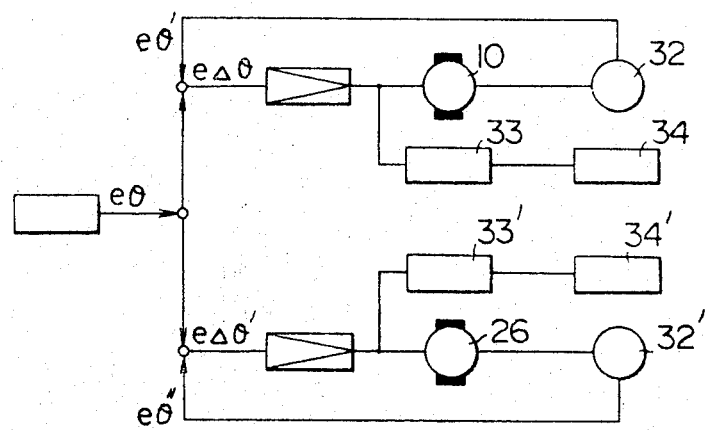
FIG. 5 is a block diagram showing one embodiment of a control means for cutter support means and frame moving means.

The control of the positions of the frame 11 and the blade 8 for applying the cutting lines 4 will be described. The position of the blade 8 can be varied according to the width of the ribbon-like glass 1. The frame 11 should be in a certain relative positions with respect to the blade 8 so that the cutting lines 4 are situated between the support roller 19 and the push roller 20. For this purpose, the positions of the blade 8 and the frame 11 are controlled so as to change exactly by the same distance. FIG. 5 shows a control mechanism for accurately changing the positions of the blade 8 and frame 11 by the same distance. A common position commanding voltage $e\theta$ is applied to a position control mechanism (upper half of FIG. 5) for the blade 8 and a position control mechanism (lower half of FIG. 5) for the frame 11. The resolver unit 32 directly connected to the servomotor for driving the blade 8 generates a feedback voltage $e\theta'$ corresponding to the angle of rotation of the servomotor 10. The deviating voltage $e\Delta\theta$ between $e\theta$ and $e\theta'$ is applied to the servomotor 10 through an amplifier, and the servomotor 10 rotates until $e\Delta\theta$ becomes zero. When $e\Delta\theta$ becomes zero, a brake 34 is actuated by a control circuit 33 to stop the blade 8. The servomotor 26 for moving the frame 11 is controlled in the same way by the position commanding voltage $e\theta$, and the position of the frame 11 is changed by the same distance as the blade 8. The mechanism for changing the position is not necessarily limited to electric one, but also includes mechanical means.

The present invention has been described above by reference to one of the best modes of practice, but it should be understood that various changes and modifications are possible so long as they do not depart from the spirit and scope of the present invention.

What is claimed is:
1. An apparatus for cutting the edges of a sheet glass, including at least two cutter means for providing cutting lines in the longitudinal direction at the desired positions across the glass sheet, two frames each having a conveyor for supporting the glass sheet and a break means for cutting the glass sheet along the cutting lines, and means for moving at least one of said frames so that said break means is in a predetermined relative position with respect to the cutting lines.

2. The apparatus of claim 1, wherein said at least two frames are arranged transversely.

3. The apparatus of claim 2, wherein the conveyor secured to said frame is a roller conveyor in which the shafts of rollers of the roller conveyor above one of said frames are arranged in positions deviating in the longitudinal direction from those of the shafts of rollers of the roller conveyor above the other frame, and when both frames approach each other, the shafts of one roller conveyor alternately come in between those of the other roller conveyor.

4. The apparatus of claim 1, wherein said two frames are arranged deviatingly from each other in the longitudinal direction.

5. The apparatus of claim 1, in which said cutter means comprises a movable blade, and which includes a position controlling mechanism for moving said blade and frame synchronously.

6. The apparatus of claim 1, wherein said cutter means comprises a plurality of blades arranged in the transverse direction, said blades being used selectively.

7. The apparatus of claim 5, wherein said position controlling mechanism includes a servomotor and a resolver connected thereto.

8. The apparatus of claim 1, wherein said break means consists of a roller for pushing down the glass sheet secured to the forward end of the piston of one cylinder and a roller for pushing down the undersurface of the glass sheet secured to the forward end of the piston of another cylinder.

9. The apparatus of claim 1, wherein said break means is composed of a push roller secured to the forward end of the piston of one cylinder and a support roller fixed at a level slightly higher than said conveyor.

* * * * *